United States Patent
Beeck et al.

(10) Patent No.: US 6,916,021 B2
(45) Date of Patent: Jul. 12, 2005

(54) SEALING ARRANGEMENT

(75) Inventors: Alexander Beeck, Orlando, FL (US); Bruno Benedetti, Graenichen (CH); Andreas Kieninger, Nussbaumen (CH); Ulrich Rathmann, Baden (CH)

(73) Assignee: Alstom Technology Ltd., Baden (CH)

( * ) Notice: Subject to any disclaimer, the term of this patent is extended or adjusted under 35 U.S.C. 154(b) by 110 days.

(21) Appl. No.: 10/383,735

(22) Filed: Mar. 10, 2003

(65) Prior Publication Data

US 2004/0012151 A1 Jan. 22, 2004

Related U.S. Application Data

(63) Continuation of application No. PCT/IB01/01750, filed on Sep. 24, 2001.

(30) Foreign Application Priority Data

Sep. 25, 2000 (DE) .......................................... 100 47 307

(51) Int. Cl.⁷ ............................................... F16J 15/44
(52) U.S. Cl. ...................................... 277/411; 277/415
(58) Field of Search ................................. 277/411–415

(56) References Cited

U.S. PATENT DOCUMENTS

| | | | |
|---|---|---|---|
| 3,185,441 A | | 5/1965 | Reuter |
| 3,339,933 A | | 9/1967 | Foster |
| 3,537,713 A | | 11/1970 | Matthews et al. |
| 3,545,882 A | | 12/1970 | Williamson |
| 4,274,806 A | | 6/1981 | Gallardo, Jr. |
| 4,460,185 A | * | 7/1984 | Grandey ...................... 277/415 |
| 4,957,411 A | | 9/1990 | Girault |
| 5,707,207 A | * | 1/1998 | Benoist et al. ............ 415/173.4 |
| 5,756,217 A | | 5/1998 | Schröder et al. |
| 5,952,110 A | | 9/1999 | Schell et al. |
| 5,976,745 A | | 11/1999 | Aoki et al. |
| 6,116,612 A | * | 9/2000 | Halliwell et al. ............ 277/412 |
| 2003/0107181 A1 | * | 6/2003 | Wieghardt ................... 277/415 |

FOREIGN PATENT DOCUMENTS

| | | |
|---|---|---|
| DE | 1576953 | 12/1970 |
| DE | 3009863 | 1/1981 |
| DE | 4432998 | 4/1996 |
| DE | 19821365 | 11/1999 |
| DE | 19848103 | 4/2000 |
| EP | 0292250 | 11/1988 |
| EP | 0666407 | 8/1995 |
| JP | 10306702 | 11/1998 |
| JP | 10339105 | 12/1998 |
| SU | 792014 | 12/1980 |

OTHER PUBLICATIONS

Search Report prepared by the German Patent Office for German Application No. 10047307.5.
International Search Report prepared by the European Patent Office for PCT Application No. PCT/IB01/01750, issued Nov. 28, 2001.

* cited by examiner

*Primary Examiner*—Enoch Peavey
(74) *Attorney, Agent, or Firm*—Cermak & Kenealy, LLP; Adam J. Cermak

(57) ABSTRACT

The present invention relates to a sealing arrangement which is formed between a rotating assembly (4, 6) and a static assembly (3, 14, 15). In this sealing arrangement, the rotating assembly (4, 6, 16) has at least one cutting element (1) which engages in a counterpart surface on the static component. The present sealing arrangement is distinguished by the fact that the cutting element (1) is designed as a chipping device with a geometrically determined cutting edge with respect to the counterpart surface (2) or forms a chipping device of this type when the rotating assembly is rotating. The proposed sealing arrangement reduces the wear to the cutting element even in the event of adverse rotation or temperature conditions.

21 Claims, 5 Drawing Sheets

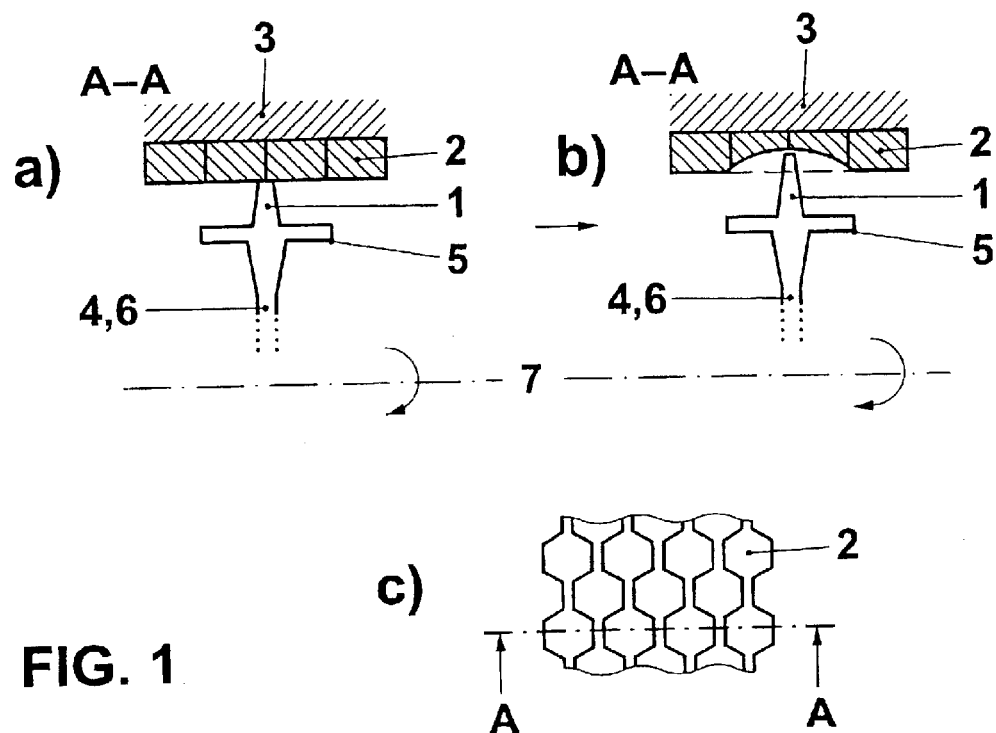
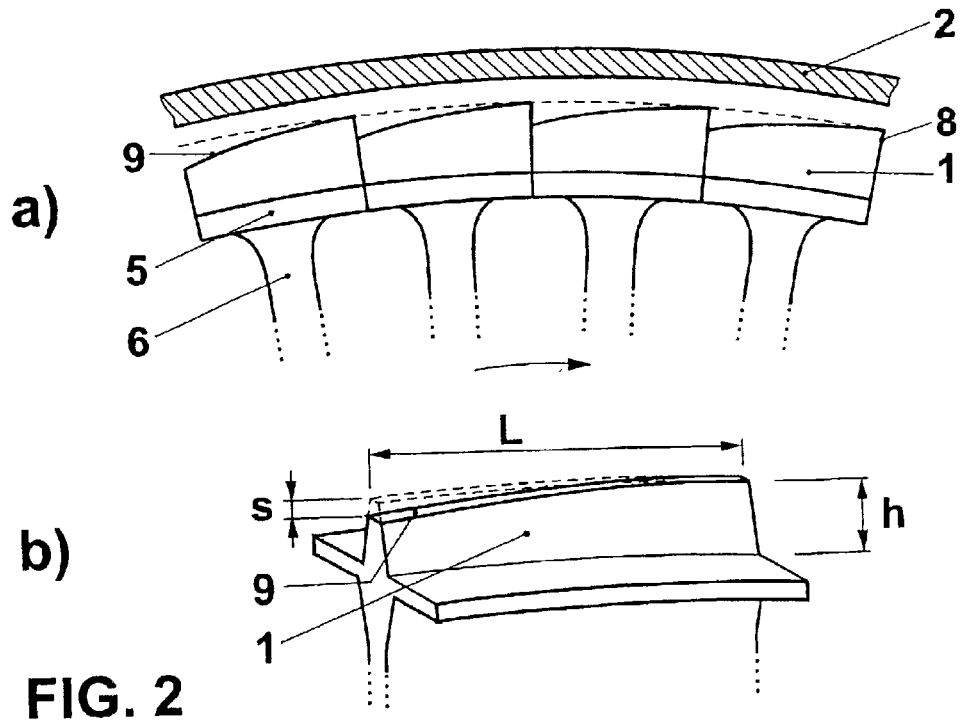
FIG. 1
FIG. 2

SEALING ARRANGEMENT

This application claims priority under 35 U.S.C. § 120 to, and is a Continuation of, International Application number PCT/IB01/01750, filed on Sep. 24, 2001, which designated the United States of America and which was published in German as International Publication number WO 02/25065; this application also claims priority under 35 U.S.C. § 119 to German patent application number 100 47 307.5, filed Sep. 25, 2000. The entireties of both the aforementioned International and German applications are incorporated by reference herein.

FIELD OF THE INVENTION

The present invention relates to a sealing arrangement for sealing a gap between a rotational member and a stationary member.

The present sealing arrangement is used in particular to reduce leakage flows within a turbomachine, for example an axial turbomachine, which may occur, for example, between the rotor blades and the casing or rotor heat shield and guide vanes.

BACKGROUND OF THE INVENTION

The efficiency of an axial-flow gas turbine is influenced, inter alia, by leakage flows of the compressed gas which occur between rotating and non-rotating components of the turbine. In this context, the gap which occurs between the ends of the rotor blades and the housing wall which surrounds the rotor blades has an influence on the magnitude of the leakage flows. The efficiency of the gas turbine can be increased by reducing the size of or sealing this gap. However, on account of the forces which occur when the turbine is operating and the thermal load, the size of the gap cannot be reduced arbitrarily. Various sealing mechanisms are known with a view to reducing the leakage flows in these regions.

For example, DE 198 48 103 A1 describes a sealing arrangement for reducing leakage flows within a rotary turbomachine, in which a felt-like material, which reduces the axial gap flows of the hot gas, is provided as sealing element between guide vanes and/or rotor blades and adjacent components of the turbomachine.

A technique which is frequently used to reduce the leakage flows in axial rotary machines is described in DE 198 21 365 A1. In this technique, sealing areas between the casing and the rotor are designed as what are known as labyrinth sealings. In these labyrinth sealings, one or more cutting elements are formed on the rotor or the rotor blade connected to this rotor and engage in counterpart surfaces on the casing wall during rotation. In this context, it has proven particularly advantageous for the counterpart surfaces to be designed in the form of honeycomb sealings.

A sealing arrangement which is designed as a labyrinth sealing and has counterpart surfaces of honeycomb structure of this type for a gas turbine is also explained in more detail in U.S. Pat. No. 5,967,745.

When a gas turbine having a sealing arrangement of this type is operated for the first time, however, the cutting elements on the rotor blades have to remove material from the counterpart surface in order to produce the intermeshing structure with a view to achieving the sealing action. Also, during operation the counterpart surface often comes into contact with the cutting elements, on account of the different forces and thermal deformation which occur at different loads. In this context, it must be ensured that the cutting elements of the rotor blades are not worn away excessively.

Therefore, it is attempted on the one hand to reduce this wear by selecting a material which is significantly harder than the counterpart surface to be used for the cutting elements of the rotor blades. On the other hand, it is also known, for example from U.S. Pat. No. 5, 952,110, to provide the cutting elements with an abrasive coating, in which abrasive particles protrude from the surface of the cutting element. These abrasive particles grind down the counterpart surface in the corresponding region.

The cutting element, which is generally formed by the shroud or the blade root of the rotor blades or is fitted thereon, engages in the counterpart surface in the above arrangements in order to achieve a sealing action. Axial and radial expansions when the turbomachine is operating cause the counterpart surface to be worn down in both the radial direction and the axial direction, during which process the cutting elements of the shroud or of the blade root of the rotor blades should not undergo any wear, in order not to disturb the balance of the rotor.

However, in the event of prolonged operation of gas turbine installations with sealing arrangements of this type, it has been found that the direction of the wear may be reversed in the event of unfavorable temperature condition or at certain circumferential velocities during operation, so that the rotating part becomes worn while the counterpart surface, particularly in the case of honeycomb structures, remains virtually untouched.

SUMMARY OF THE INVENTION

Accordingly, one object of the invention is to provide a novel improved sealing arrangement in which the wear to the rotating assemblies, in particular to the cutting elements of these assemblies, is significantly reduced even in the event of unfavorable rotational and temperature conditions.

The object is achieved by the sealing arrangement in accordance with patent claim 1. Advantageous configurations of the sealing arrangement form the subject matter of the subclaims.

The present sealing arrangement is formed between an assembly which rotates about an axis of rotation and a static assembly, and in particular forms part of a turbomachine. In the sealing arrangement, one or more cutting elements on the rotating assembly engage in a counterpart surface on the static assembly, as is known from the prior art. The present sealing arrangement is distinguished by the fact that at least one of the cutting elements is designed as a chipping means with a geometrically determined cutting edge with respect to the counterpart surface or, when the rotating assembly is rotating, is formed into a chipping means of this type.

According to the invention, therefore, it has been discovered that by using a special geometric form of the cutting element, the wear to this element can be reduced even in the event of unfavorable operating conditions of the basic rotating assembly.

While in the known sealing arrangements, the cutting elements on rotor blades are arranged in succession in the circumferential direction, in such a manner that they present a substantially smooth surface with respect to the counterpart surface, in the present sealing arrangement at least one of the cutting-edge-elements forms a chipping means with respect to the counterpart surface. For this purpose, this cutting element has to form a cutting wedge with respect to the counterpart surface, projecting accordingly with respect to the adjacent surfaces. This can be achieved on the one hand by forming a corresponding geometrically determined cutting edge on the respective cutting element. On the other hand, this can also be achieved—particularly in the case of the cutting element formed by the shroud of the rotor blade—by forming the entire cutting element in the form of a geometrically determined cutting edge which, when the rotating assembly is rotating, fulfills the cutting function with respect to the counterpart surface.

Unlike the abrasive coating with projecting abrasive particles which is known from the prior art and forms a geometrically undefined cutting edge, in the present sealing arrangement a geometrically undefined cutting edge is used as a result of a particular configuration and/or arrangement of the cutting element. This has the advantage of a lower loss of action, since in particular the known abrasive particles can easily become detached from the surface during operation, so that the grinding action is lost.

In a particular embodiment of the present invention, the sealing arrangement is used to form a sealing between the rotor blades and the adjacent casing. The shrouds of the rotor blades are in this case formed as cutting edges which, compared to the known design of these cutting edges, are beveled in the opposite direction to the direction of rotation on their upper side, so that they have a tool face and a freeform face with respect to the counterpart surface. In this way, a saw tooth profile which effects the cutting action on the counterpart surface is formed as a result of these shrouds being arranged in series in the circumferential direction.

Since this beveling of the cutting elements of the shrouds leads to a wedge-shaped gap between the respective shroud and the counterpart surface and therefore an increase in leakage flows, in a particularly advantageous embodiment an arrangement of the shrouds in which these shrouds are deliberately unbalanced in terms of the way in which they are secured to the rotor blade is produced. The unbalanced shrouds, which are connected to the rotor blades not at their center of gravity but rather in front of their center of gravity, as seen in the circumferential direction, means that the wedge-shaped gap is automatically closed up while the rotary stage is operating on account of the centrifugal forces which are active during the rotation. The cutting action of this arrangement therefore exists only in a low circumferential speed range of the rotating components, while at higher circumferential speeds the sealing action is increased.

In a further advantageous embodiment, this wedge-shaped gap is closed up by thermal deformation when the rotating assembly is operating. This embodiment makes use of the fact that the thermal load on the rotating assembly is not constant over the entire rotor blade and its shroud in the case of gas turbines, but rather has a defined distribution. By utilizing this position-dependent thermal load, it is possible to achieve controlled deformation of the rotor blades with the shroud, during which the wedge-shaped gap is closed up.

This deformation and the utilization of unbalanced shrouds can also be used to actually enable the cutting action of the cutting elements only as a result of the rotation of the assembly. In this case, the cutting-edge-elements are constructed in the same way as is known from the prior art. By targeted deviation from a balanced arrangement of the shrouds, it is possible to make the front region, as seen in the circumferential direction, of the shrouds with the cutting elements bend radially outward, so that as a result a free angle is formed with respect to the counterpart surface. Therefore, the entire arrangement only reveals the desired sawtooth-like profile when the circumferential velocity is sufficiently high.

Of course, to utilize the cutting effect which is intended in accordance with the invention, it is not necessary for all the cutting elements to have this cutting function. Rather, it is also sufficient if only one of the shrouds of the rotating stage has an element of this type.

In a further embodiment, the cutting elements, which are designed as chipping means with a geometrically determined cutting edge, are in addition partially hardened at their cutting-edge corners. This partial hardening can be effected by measures which are known from tool engineering, for example by the application of a Cr or TiN layer or other coatings which are suitable for high temperatures, for example Hardalloy-h, SiC, $Al_2O_3$. The partial hardening of the cutting-edge corners results in automatic sharpening of these cutting-edge corners during operation, so that the cutting action remains ensured even over the course of a prolonged operating time.

The present sealing arrangement is suitable in particular for turbomachines, such as for example gas turbines, and may be used in particular between the rotor-blade tips and the casing inner wall, between the rotor-blade roots and adjacent guide vanes, between heat-accumulation segments of the rotor and adjacent rotor blades or between heat-accumulation segments and a housing inner wall. In principle, they are suitable for any form of sealing between a rotating assembly and a static assembly.

BRIEF DESCRIPTION OF THE DRAWINGS

The present sealing arrangement is explained in more detail below on the basis of exemplary embodiments in conjunction with the drawings, without implying any restriction to the general idea on which the invention is based. In the drawing:

FIG. 1 *a–c*: show an example of the method of operation and the structure of a labyrinth sealing with honeycomb structure in accordance with the prior art in gas turbines;

FIG. 2*a/b*: show an example of the formation of the cutting elements of the shrouds of a turbine stage as part of the present sealing arrangement;

DESCRIPTION OF THE PREFERRED EMBODIMENTS

Figure 3:
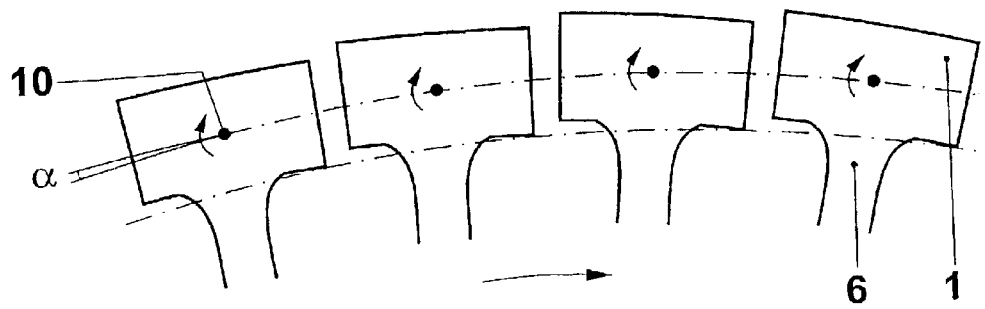
FIG. 3: shows an embodiment for illustrating the method of operation of an unbalanced shroud in the present sealing arrangement.

Referring now to the drawings, wherein like reference numerals designate identical or corresponding parts throughout the several views, FIG. 1a shows an example of the structure of a sealing arrangement in a turbine stage of a gas turbine. The sealing arrangement illustrated is formed by a counterpart surface 2 in honeycomb structural form as an example on the static component 3, in this case the casing wall, and a cutting element 1 on the shroud 5 of a rotating rotor blade 6. The direction of rotation of the rotor blade 6 about the axis of rotation or rotor axis 7 is indicated by an arrow. FIG. 1b illustrates the cutting action of the cutting element 1 into the counterpart surface 2. Axial and radial expansions of the rotor blade 6 while the gas turbine is operating causes the counterpart surface 2 to be worn away in both the axial direction and the radial direction.

FIG. 1c shows a plan view of an example of the design of a honeycomb structure which is used to form the counterpart surface.

In this known sealing arrangement, the cutting element 1 forms the abrasive element, while the material of the counterpart surface 2 forms the material which is to be abraded. The sealing arrangement according to the invention, which is explained below on the basis of a plurality of exemplary embodiments in conjunction with FIGS. 2 to 9, is proposed with a view to avoiding a mechanism which reserves this mode of action, as may occur with unfavorable rotational speeds and temperature conditions.

These exemplary embodiments in each case relate to a particular form of the cutting element of a shroud of a rotor blade. Of course, the geometric statements made in connection with these cutting elements can also be transferred to other parts of rotating assemblies. Furthermore, a plurality of cutting edges or cutting elements connected in series are also possible.

FIG. 2a shows an excerpt from a row of rotor blades of a gas turbine, in which the shroud 5 at the radial tip of the rotor blades 6 is formed as a cutting element 1. The shrouds may in axial section be of a form which is illustrated, by way of example, in connection with FIG. 1. The direction of rotation is once again indicated by the arrow. In this exemplary configuration of the present sealing arrangement, the counterpart surface 2 is formed as a honeycomb structure.

The cutting elements 1 of the shrouds 5 of the rotor blades are in this example each beveled at their top side, so that they form a tool face 8 and a free face 9 with respect to the counterpart surface 2. The hatched region in this context shows the altered form compared to the standard design of elements of this type. In this illustration, the counterpart surface 2 is only illustrated at a distance in order to clarify the representation of the cutting elements 1.

This design of the cutting elements as chipping means with a geometrically determined cutting edge results in a cutting action while the rotor blades are rotating, allowing significantly reduced wear even in the event of unfavorable rotational speeds and temperature conditions.

The design of the cutting elements for achieving this cutting geometry is illustrated again in FIG. 2b in perspective view on the basis of one of the cutting elements. In this figure, the dashed line indicates the beveling compared to a conventional element of this type which is known from the prior art. If this cutting element is of standard height h and length L, as present in the known gas turbine arrangements in the first turbine stage, the dimension or height difference s of the bevel, as illustrated in the figure, preferably satisfies the following condition: $0.01\ h \leq s \leq 0.5\ h$. This generally leads to a height difference s in the range from 0.1 to 10 mm. This type of geometry of the cutting element is already taken into account in the production of the turbine blade and can also be achieved by targeted remachining.

FIG. 3 shows an advantageous embodiment, in which the increased leakage between the shroud 5 and the opposite casing wall 3 which results with a configuration of the cutting element as shown in FIG. 2 is avoided. In this embodiment, the cutting-edge geometry is selected precisely as has already been explained in connection with FIG. 2. By taking suitable account of the thermal deformations which occur during rotation or by means of a targeted unbalanced arrangement of the shrouds 5 on the blade 6, it is possible to achieve the effect whereby the wedge-shaped gap between the counterpart surface 2 and the cutting element 1 which forms as a result of the bevel and is indicated by the hatched region in FIG. 2a closes up as a result of the forces and/or thermal deformation which are active after a critical rotational speed range or temperature range has been passed through it. This mechanism is diagrammatically indicated in FIG. 3 by the arrows at the cutting edges 1, which show a rotation or a bending of the shroud 5 about the mounting or connecting center axis 10 of the connection to the rotor blades 6 during rotation. This bending, which may also be thermally induced, as has already been mentioned above, leads to the wedge-shaped gap with the freeform angle α closing up, the figure showing the state after the gap has already been closed up.

Figure 4:
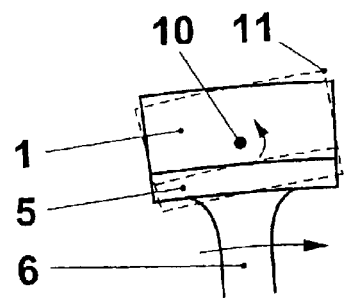
FIG. 4: show an example of a configuration of the cutting element of a shroud which only reveals the cutting action when the assembly rotates.

FIG. 4 shows an embodiment in which the cutting element 1, in the at-rest state of the gas turbine, does not form a chipping means with a geometrically determined cutting edge, but rather is shaped as is known in the arrangements of the prior art. As a result of this cutting element 1 and/or the shroud 5 with this cutting element being fitted to the rotor blade 6 in a suitable way, it is possible to ensure that the front part (as seen in the direction of rotation) as the cutting element 1 moves in the radial direction when the rotor blade 6 rotates, so that, together with the cutting-edge corner 11 which projects as a result, it produces the cutting action. In this configuration, the shroud 5 is not balanced, but rather its center of gravity lies in front of the longitudinal axis of the rotor blade 6, as seen in the direction of rotation.

Figure 5:
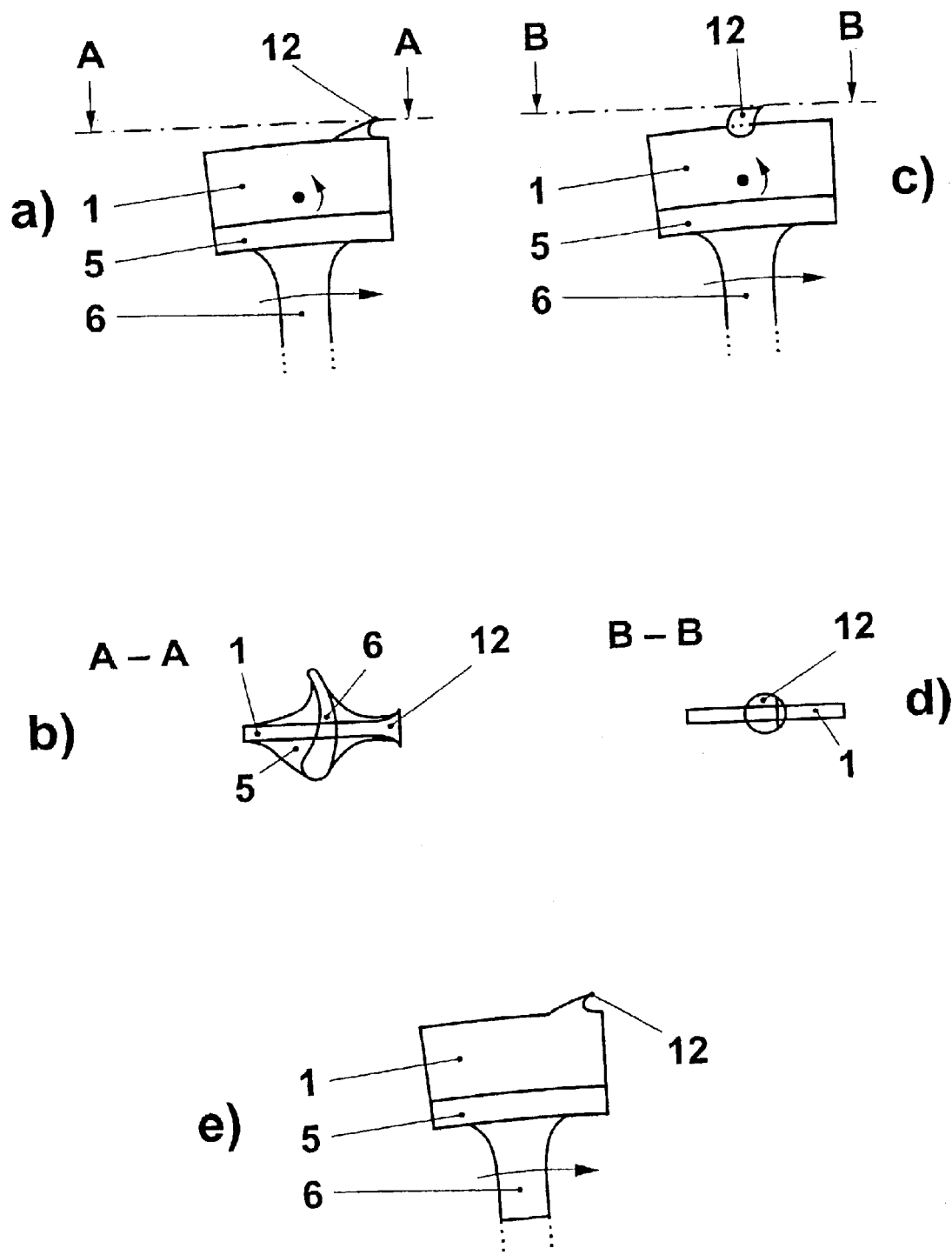
FIG. 5a–e: show a plurality of examples of cutting edges which have been fitted onto or integrated in the shroud in order to produce the present sealing arrangement.

FIG. 5 shows three examples in which the cutting element 1 is provided with a separate cutting tooth 12. FIGS. 5a and 5b of this figure show a side view and a plan view of a cutting tooth 12, which is raised up in a suitable way from the surface of the cutting element. In addition to this positioning of the cutting tooth 12 in the front region of the cutting element 1, as seen in the direction of rotation, it may also, by way of example, be positioned centrally, as shown in side view and plan view in FIGS. 5c and 5d.

FIG. 5e shows a further configuration, in which the cutting tooth 12 is integrated in the front part of the cutting element 1.

The geometric configuration of this cutting tooth 12 must, of course, be effected in such a manner that the cutting action with respect to the counterpart surface 2 is fulfilled at least over a rotational speed range. Suitable geometric shapes are known from tool technology. Furthermore, it is possible for a plurality of these cutting teeth 12 to be fitted to one cutting element 1.

Figure 6:
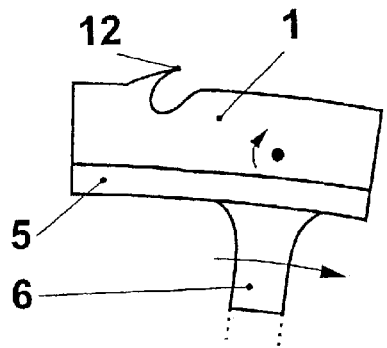
FIG. 6: shows an example of the combination of an unbalanced shroud with a cutting edge which is integrated in the shroud.

FIG. 6 shows a further example, in which a separate cutting tooth 12 is formed in the upper region of the cutting element 1. In this configuration, the shroud 5 is additionally not balanced, its center of gravity being shifted toward the rear in the direction of rotation with respect to the securing center axis on the rotor blade 6. This configuration causes the rear part of the cutting element 1 to move toward the counterpart surface during rotation, in order in this way to intensify the cutting action.

Figure 7:
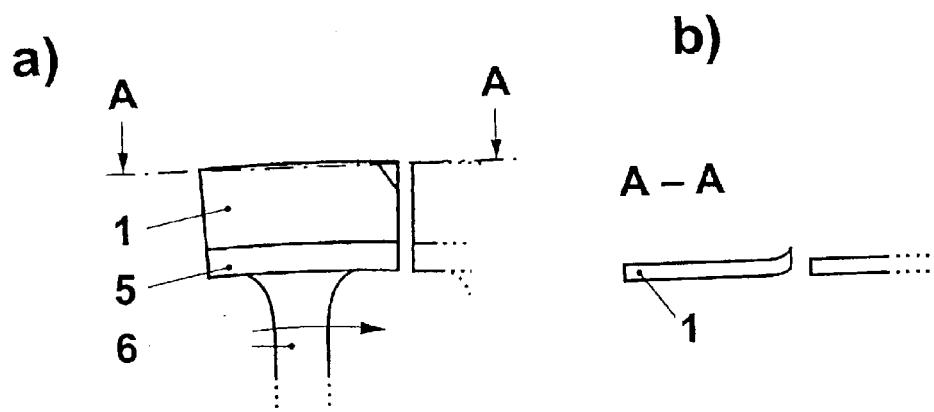
FIG. 7: shows a further example of the form of the geometrically determined cutting edge in the shroud of a rotor blade.

FIG. 7 shows a further configuration of the cutting element of a sealing arrangement according to the invention in side view and in plan view. In this configuration, the front corner, as seen in the direction of rotation, of the cutting element is sharpened or bent laterally, as can be seen clearly from the plan view. This lateral sharpening or bending results in the desired cutting function with respect to the counterpart surface.

Figure 8:
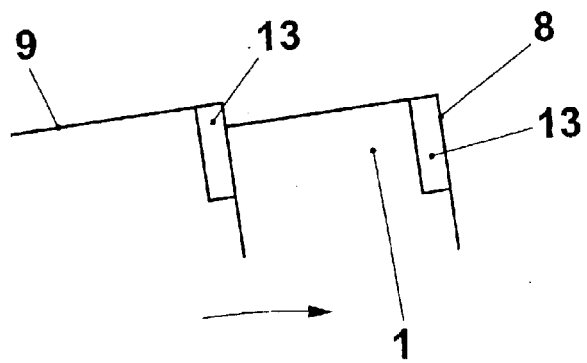
FIG. 8: diagrammatically depicts the partially hardened regions of a cutting edge for use in the present sealing arrangement.

FIG. 8 shows an example of a form of the cutting element in which the tool face 8 is hardened compared to the remaining area. The hardened region is indicated by reference numeral 13. This partial hardening of the cutting edge results in automatic sharpening as a result of wear to the free face 9.

Figure 9:
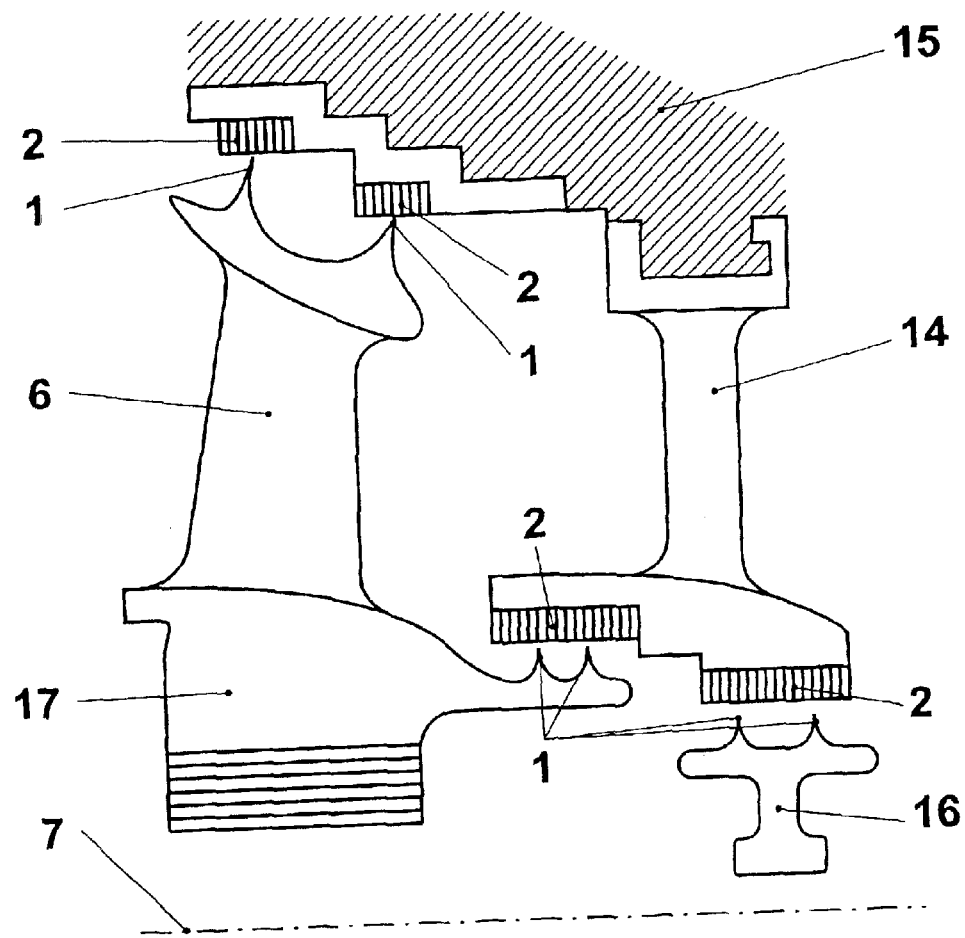
FIG. 9: shows an example for different regions within a gas turbine in which the present sealing arrangement can be used.

Finally, FIG. 9 diagrammatically depicts various regions of a gas turbine in which the present sealing arrangement can be used. By way of example, the figure illustrates the axis of rotation 7, a rotor blade 6, a guide vane 14, the surrounding casing 15 and the rotor heat-accumulation segment 16. To avoid leakage flows in the axial direction, the shroud of the rotor blade 6 is designed with two cutting elements 1 which engage in corresponding counterpart surfaces 2 on the casing 15 (not shown here for reasons of clarity). This sealing arrangement on the blade shroud can be produced using the cutting edges which have been proposed in accordance with the invention.

A further sealing between the blade root 17 of the rotor blade and the adjacent guide vane 14 with an overhanging design of the blade root 17 is another example of a possible application for the present sealing arrangement. In this case, the two cutting elements 1 on the blade root 17 opposite the counterpart surface 2 formed on the guide vane 14 are shaped appropriately in order to achieve the cutting function which has been described.

A further example of a possible application for the present sealing arrangement is that of forming a sealing between the heat-accumulation segment 16 of the rotor and the static guide vanes 14. In this case too, the cutting elements 1 formed on the heat-accumulation segment 16 are formed in accordance with the present invention.

It will be automatically understood that the number of the cutting elements which adjacent to one another engage in the counterpart surfaces which is illustrated in the present exemplary embodiment and in the preceding exemplary embodiments is not restricted to the number illustrated in each case. The number of these cutting elements plays no role in the realization of the present invention.

In the same way, it is irrelevant whether in each case only the cutting element of a rotor blade or a shroud or blade root fulfills the cutting function, or whether this function is fulfilled in some or all of the rotor blades of a row of rotor blades.

Obviously, numerous modifications and variations of the present invention are possible in light of the above teachings. It is therefore to be understood that within the scope of the appended claims, the invention may be practiced otherwise than as specifically described herein. The entirety of each of the aforementioned documents is incorporated by reference herein.

We claim:

1. A rotor member defining a radial direction, a rotor circumference, and a direction of rotation, the rotor member comprising:
   a rotor blade having a radial outer tip;
   shroud arranged at the rotor blade radial outer tip, the shroud comprising
      a cutting element on a radial outer side, the cutting element defining a chipping tool, said chipping tool comprising
         a geometrically defined cutting edge,
         a tool face, and
         a tool flank, the tool flank being beveled at a relief angle defined with respect to the circumferential direction;
   wherein the shroud is configured and arranged on the blade in an imbalanced manner in the circumferential direction to tilt under the influence of at least one of centrifugal forces upon rotation of a rotor comprising the member,
   thermal deformations upon heating of the blade, or combinations thereof, to modify said relief angle upon operation of the blade when operating in at least one of
      a rotating arrangement,
      a heating environment, or
      combinations thereof.

2. The member of claim 1, wherein the chipping tool tool face is oriented towards the direction of rotation.

3. The member of claim 1, wherein the shroud is imbalanced such that a section facing forward in the direction of rotation is tilted radially outwardly upon operation, thereby enlarging the relief angle.

4. The member of claim 3, wherein the relief angle is substantially zero in steady state.

5. The member of claim 1, wherein the shroud is imbalanced such that a section facing backward in the direction of rotation is tilted radially outwardly upon operation, thereby reducing the relief angle.

6. The member of claim 5, the shroud has a center of gravity located in a backward facing section of the shroud, relative to the direction of rotation, as seen from the blade connection.

7. The member of claim 5, wherein the tool is configured and arranged so that the relief angle is substantially zero above a predetermined speed and temperature when in a rotating arrangement.

8. The member of claim 1, wherein the cutting element in its entirety forms the tool face and the tool flank, thus forming the chipping tool.

9. The member of claim 8, wherein the cutting element comprises a sealing strip arranged on the shroud configured and arranged to build a labyrinth seal when positioned with a stationary counterpart.

10. The member of claim 9, wherein the tool face is formed at a radially outer forward facing section of the sealing strip.

11. The member of claim 10, wherein section of the sealing strip forms the tool face and is hardened.

12. The member of claim 1, further comprising:
   a cutting tooth at the cutting element, the cutting tooth comprising the chipping tool.

13. The member of claim 12, wherein the cutting tooth is positioned at a radially outer side of the cutting element.

14. The member of claim 12, further comprising:
   a sealing strip arranged on the shroud configured and arranged to form a labyrinth seal when positioned with a stationary counterpart;
   wherein the cutting tooth is arranged on a radially outer side of the sealing strip.

15. A rotor of a turbomachine, comprising:
   a rotor blade row comprising at least one member according to in claim 1.

16. A turbomachine comprising:
   a rotor according to claim 15.

17. A sealing arrangement for sealing a gap between a rotational member and a stationary member, comprising:
   a member according to claim 1; and
   a stationary member having a counterpart surface facing the shroud in the radial direction.

18. The arrangement of claim 17, further comprising:
   a sealing strip arranged on a radially outer surface of the shroud and forming a labyrinth seal with the counterpart surface.

19. The arrangement of claim 17, wherein, the rotating member radially overlaps the when counterpart in operation.

20. The arrangement of claim 19, wherein the stationary member comprises a honeycomb sealing, a felt, or a porous material, forming the counterpart surface.

21. The arrangement of claim 17, wherein the stationary member comprises a gas turbine housing.

* * * * *